(12) United States Patent
Courchaine et al.

(10) Patent No.: US 9,529,173 B2
(45) Date of Patent: Dec. 27, 2016

(54) OPTICAL FIBER FURCATION ASSEMBLY AND METHOD

(71) Applicant: AFL Telecommunications LLC, Duncan, SC (US)

(72) Inventors: Wilfred Courchaine, Moore, SC (US); Roger Vaughn, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 14/897,540

(22) PCT Filed: Jun. 10, 2014

(86) PCT No.: PCT/US2014/041706
§ 371 (c)(1),
(2) Date: Dec. 10, 2015

(87) PCT Pub. No.: WO2014/200999
PCT Pub. Date: Dec. 18, 2014

(65) Prior Publication Data
US 2016/0124174 A1 May 5, 2016

Related U.S. Application Data

(60) Provisional application No. 61/833,395, filed on Jun. 10, 2013.

(51) Int. Cl.
*G02B 6/44* (2006.01)
*G02B 6/46* (2006.01)

(52) U.S. Cl.
CPC ........... *G02B 6/4472* (2013.01); *G02B 6/4471* (2013.01); *G02B 6/4497* (2013.01); *G02B 6/46* (2013.01)

(58) Field of Classification Search
CPC ... G02B 6/4471; G02B 6/4472; G02B 6/4497; G02B 6/46
See application file for complete search history.

(56) References Cited

U.S. PATENT DOCUMENTS

| 4,645,295 A * | 2/1987 | Pronovost ............ G02B 6/3831 385/55 |
| 5,381,501 A | 1/1995 | Cardinal et al. |
| 6,389,214 B1 | 5/2002 | Smith et al. |
| 6,738,555 B1 | 5/2004 | Cooke et al. |

(Continued)

OTHER PUBLICATIONS

International Search Report and Written Opinion issued in corresponding international application No. PCT/US2014/041706 on Oct. 8, 2014.

(Continued)

*Primary Examiner* — Daniel Petkovsek
(74) *Attorney, Agent, or Firm* — Dority & Manning, P.A.

(57) ABSTRACT

A furcation assembly for use with multi-fiber optical fiber cable comprises a housing having a first housing piece and a housing cover. The first housing piece has a furcation block at which a plurality of furcation tubes are terminated and which is configured to receive an end portion of the optical fiber cable such that respective optical fibers thereof may be inserted into a selected furcation tube. The housing cover is received over the first housing piece so as to be locked in a closed position. When the housing cover is in the closed position, the multi-fiber cable is axially retained with respect to the housing.

12 Claims, 10 Drawing Sheets

(56) References Cited

U.S. PATENT DOCUMENTS

| | | | |
|---|---|---|---|
| 7,270,485 B1 | 9/2007 | Robinson et al. | |
| 7,461,981 B2 * | 12/2008 | Yow, Jr. | G02B 6/4471 |
| | | | 385/76 |
| 7,787,740 B2 * | 8/2010 | Kluwe | G02B 6/4477 |
| | | | 385/135 |
| 7,903,925 B2 | 3/2011 | Cooke et al. | |
| 8,662,760 B2 * | 3/2014 | Cline | G02B 6/3887 |
| | | | 385/76 |
| 8,958,673 B2 * | 2/2015 | Cline | G02B 6/3889 |
| | | | 385/100 |
| 9,140,872 B2 * | 9/2015 | Sedor | G02B 6/4472 |
| 2010/0092136 A1 | 4/2010 | Nhep | |
| 2011/0091169 A1 | 4/2011 | Van Der Meulen et al. | |
| 2012/0230636 A1 | 9/2012 | Blockley et al. | |

OTHER PUBLICATIONS

NetIG "RCI Pre-Terminated MTP Trunk and Fanout Cables,".
Corning "Field Installation of Spider Fan-Out Kits (Plus) for 4-24 Fiber Cables," Standard Recommended Procedure 000-063, Issue 14, Aug. 2010.
Opticonx "SPKL Series Fiber Optic Splitter Kits," Jan. 21, 2015.
Fiber, Cable & Management "Splitter Kits & Pulling Eyes," p. C-11.

* cited by examiner

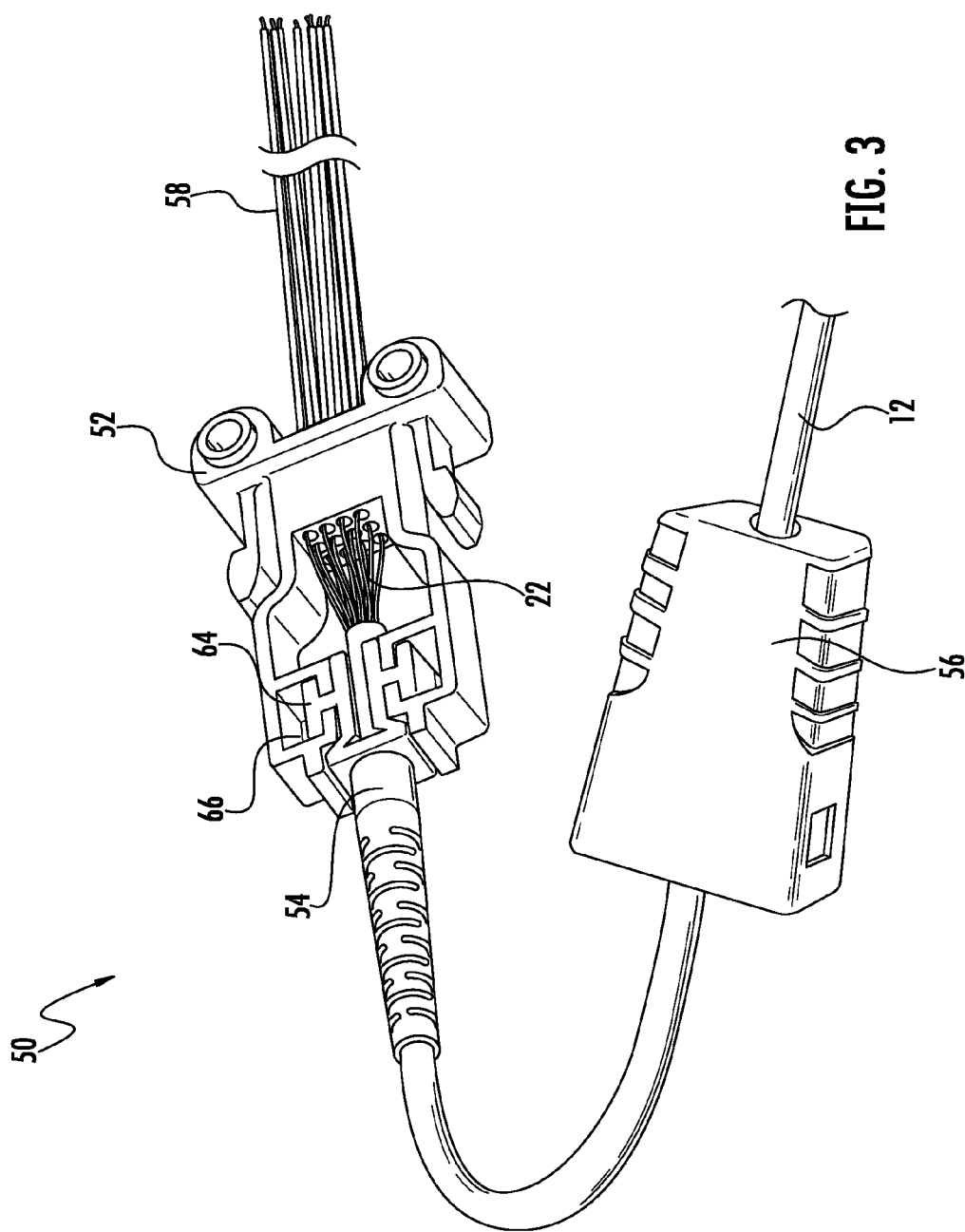

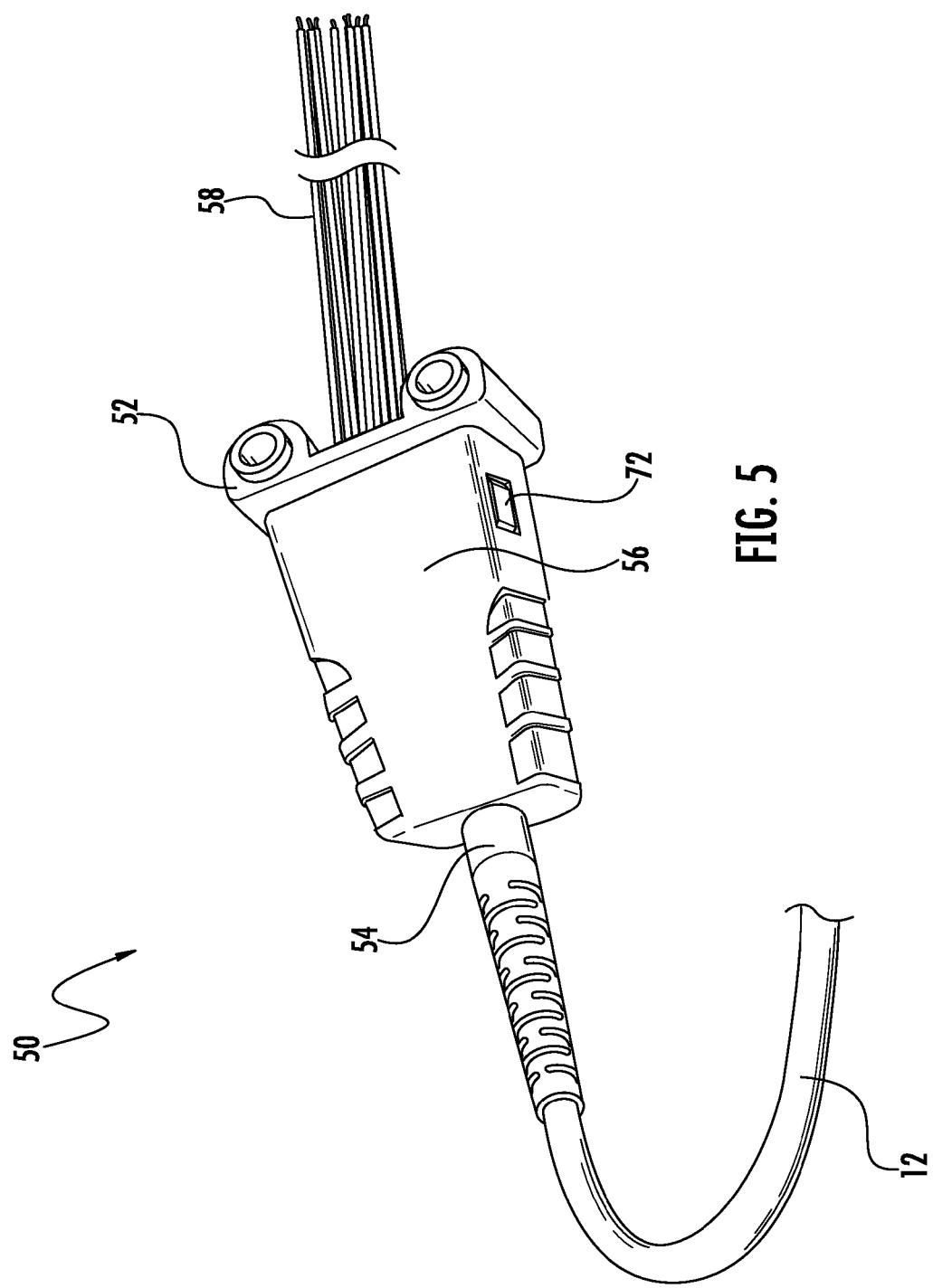

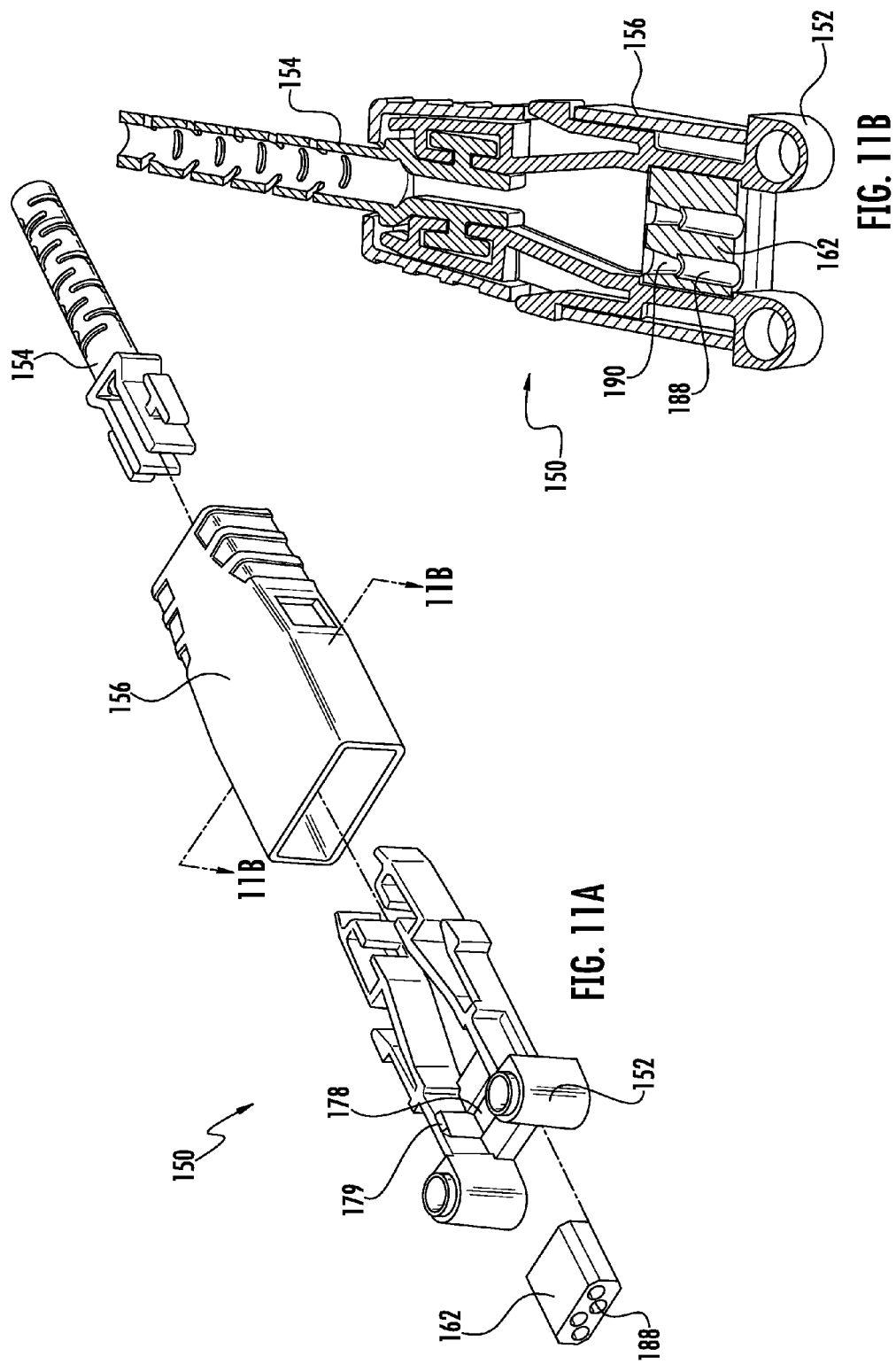

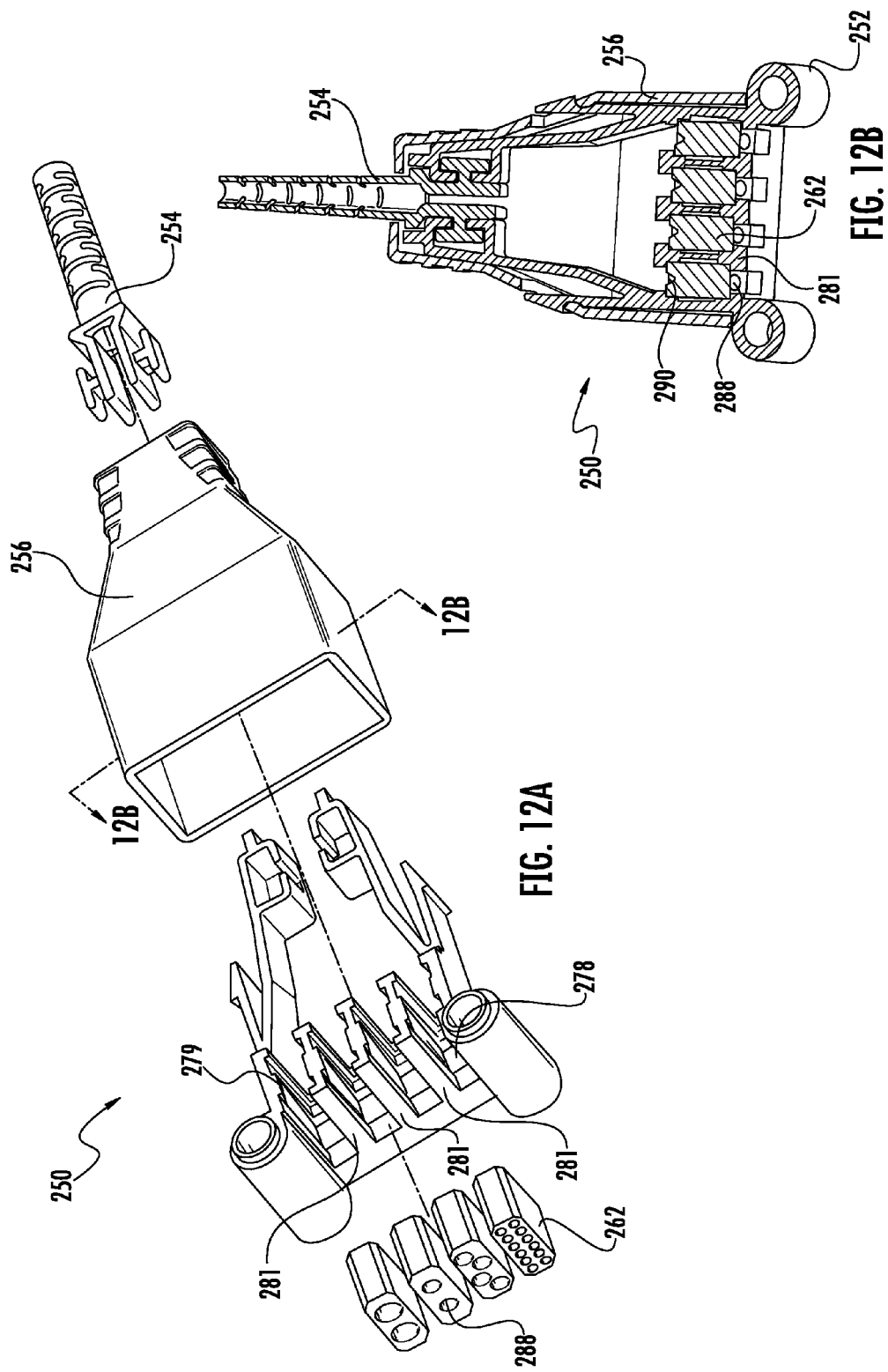

OPTICAL FIBER FURCATION ASSEMBLY AND METHOD

FIELD OF THE INVENTION

The present invention relates to the art of optical fibers. More particularly, the present invention relates to a furcation assembly for "fanning out" (i.e., separating) individual optical fibers from a cable having a plurality of optical fibers.

BACKGROUND

The ability of high-quality optical fiber to transmit large amounts of information without appreciable signal degradation is well known. As a result, optical fibers have found widespread use in many applications, such as voice and data transmission. Particularly in the private network and industrial markets, there is a continuing trend in which copper-based wiring is being replaced with fiber optic cabling for communication and sensing applications.

Optical fiber is typically supplied and installed as fiber optic cable. The term "fiber optic cable" refers to the combination of the actual optical fiber plus the structure in which it is carried and protected during and after installation. Generally, a fiber optic cable includes the optical fiber, aramid fibers or other strength members, and an outer jacket. Multiple optical fibers are often combined in a multi-fiber cable. Multi-fiber cables efficiently carry the requisite number of fibers to the point(s) of applied use, where it is then necessary to separate each individual optical fiber and terminate them with fiber optic connectors. In some circumstances, it may be desirable to separate the optical fibers in the multi-fiber cable into smaller groups of fibers (e.g., for different floors or areas of a building).

A furcation assembly serves as a means to facilitate the separation of multi-fiber cables by providing a protective housing for transitioning the individual fibers from the multi-fiber cable. Furcation (or "fan-out") assemblies generally fall into two categories: pre-configured and field-installable. Field-installable furcation assemblies are partially configured at the factory, but final installation is completed in the field or other area of application.

Furcation assemblies are needed because individual optical fibers that are separated from the multi-fiber cable are protected only by a thin protective sheath. In many cases, for example, the individual fibers are only 250 μm bare fibers that require careful handling to avoid damage. Therefore, a furcation assembly (or "kit") must be used to safely handle and deliver the optical fibers to furcation tubes. Furthermore, in order to prevent degradation of the connected fibers, the furcation assembly must protect the fibers from moisture, dust, and other contaminants.

An exemplary prior art furcation kit 10 is shown in FIG. 1. As can be seen, furcation kit 10 includes several common components used to separate individual fibers of a multi-fiber cable 12. In this regard, cable 12 is received in a housing comprising a top housing 14 and bottom housing 16 in which furcation is accomplished. In addition, a furcation block 18 holds a plurality of furcation tubes 20 which protect each optical fiber and give it a diameter suitable for a standard fiber optic connector. When furcation is complete, the individual optical fibers thus extend through the respective furcation tubes 20.

To use furcation kit 10, the outer jacket 24 and any strengthening member(s) of the multi-fiber cable 12 are stripped away to expose a desired length of the individual optical fibers. As is well known, each of the optical fibers typically includes an optical conductor (i.e., glass fiber) encased in a protective sheath. The protective sheath is typically an acrylate material that is bonded to the optical conductor as it is manufactured. The colors of the protective sheaths are typically those of the standard fiber marking scheme (blue, orange, green, brown, slate, white, red, black, yellow, violet, rose, and aqua). In this regard, furcation block 18 is preassembled with colored furcation tubes 20 that correspond with the color-coded protective sheaths. Individual optical fibers are inserted into a respective hole of the furcation block 18 and pushed through the furcation tube 20 that corresponds in color until the fiber exits the other end.

Once all of the optical fibers have been passed through the corresponding furcation tubes 20, the furcation block 18 and multi-fiber cable 12 are fixed in the furcation housing to prevent relative motion between the two. To accomplish this, the furcation block 18 is placed in the bottom housing 16 such that the recessed slots 32 of the furcation block 18 engage corresponding retention ridges 34 in the housing. Multi-fiber cable 12 is then placed in the channel 35 formed in the bottom housing 16 and secured by pinching the metal crimping tabs 36 onto the outer jacket 24. To complete the assembly, the top housing 14 is placed on the bottom housing 16 and the housings are pressed together until the housing clips 38 engage.

Typical furcation kits, similar to those shown in FIG. 1, have certain disadvantages. For example, in most cases, furcation kits are not designed to use furcation tubes with strength elements such as kevlar/aramid fibers. Moreover, current furcation kits are costly, and are generally difficult to use. For example, as described above, the technician typically has to crimp metal tabs over the multi-fiber cable to provide retention force. Not only does this metal crimp feature add to the cost of the product, but it is an inconsistent method of securing the multi-fiber cable and can damage the individual fibers. Also, because the retention force is not always consistent, the cable could be pulled out of the unit during installation or other handling.

In addition, the individual optical fibers are difficult to insert into the small furcation tubes because the furcation block holes are very small and the openings are difficult to see. Attempting to push the fibers into the tubes can cause damage to the fibers. Furthermore, because the optical fibers that are used in multi-fiber cables often have a color-coded protective sheath, the technician must place each optical fiber into the furcation tube matching in color—a very time-consuming process. The use of colored furcation tubes also adds to the cost of the product because they must be glued to the furcation block in a consistent pattern and the adhesive procedure must ensure that the ends of the tubes are not clogged with adhesive.

Finally, current furcation kits do not have a simple method to take the unit apart if needed. The current products also do not have a good means of stacking multiple units.

Examples of prior art furcation kits are shown in the following patents, each of which is incorporated herein by reference in its entirety for all purposes: U.S. Pat. Nos. 6,738,555; 6,389,214; and 5,381,501.

The present invention recognizes the foregoing considerations, and others, of the prior art.

SUMMARY

In accordance with one aspect, the present invention provides a furcation assembly for use with an optical fiber cable having a plurality of optical fibers. The furcation assembly comprises a housing having a first housing piece and a second housing piece, wherein the first housing piece comprises a furcation block at which a plurality of furcation tubes are terminated, the furcation block being configured to receive an end portion of the optical fiber cable such respective optical fibers may be inserted into a selected furcation tube. The second housing piece is received over the first housing piece so as to be locked in a closed position, and the optical fiber cable is axially retained with respect to the housing when the second housing piece is locked in the closed position.

The furcation assembly may further comprise a resilient gripping element which is urged into engagement with an outer surface of the optical fiber cable when the housing is in the closed position. The first housing piece and second housing piece may have complementary ramped surfaces which together function to urge the gripping element into engagement with the outer surface of the optical fiber cable. The gripping element may further comprise two opposed pad structures which have a concave engaging surface to engage the outer surface of the optical fiber cable. The gripping element may also comprise a retaining element interlocking with a complementary structure in the first housing piece, such that the gripping element is fixed with respect to the first housing piece.

Another aspect of the present invention provides a furcation assembly wherein the furcation block is an integral part of the first housing piece. The furcation block may be a separate unit that is attached to the first housing piece. Furthermore, the furcation block may have through bores for receiving each of the plurality of optical fibers, and wherein the cable end of the through bores further comprises a funnel-shaped opening. The furcation tubes connected to the furcation block may be transparent.

Still another aspect of the present invention provides a furcation assembly wherein the housing has a pin and socket configured to facilitate the stacking of multiple furcation assemblies. The housing may also include an aperture that is configured to receive a fastening member.

In another embodiment of the furcation assembly of the present invention, complementary surfaces of the first housing piece and second housing piece have at least one locking tab and aperture, respectively, that releasably engage each other to lock the second housing piece in the closed position while allowing for disassembly of the housing. The second housing piece may be configured to releasably engage the first housing piece in the closed position, such that it may be released and removed by pressing the locking tab.

Still another embodiment of the present invention may provide for a method for furcating a multi-fiber cable that contains a plurality of optical fibers. The method comprises feeding the end of the multi-fiber cable through a housing cover and a protective boot; removing a portion of the outer jacket from the multi-fiber cable and thus exposing a desired length of the optical fiber; and feeding each optical fiber through an aperture in a furcation block and through furcation tubes that are attached to the apertures on the furcation block. The protective boot is then secured to the first housing piece by inserting integral protruding retaining feature into a corresponding boot retaining slot in the first housing piece. Finally, the housing cover is slid over the first housing piece, thereby urging the protective boot into gripping contact with the multi-fiber cable and ensuring axial retention. The housing cover is releasably locked onto the first housing piece to secure the entire assembly.

Other objects, features and aspects of the present invention are provided by various combinations and subcombinations of the disclosed elements, as well as methods of practicing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which:

FIG. 3 is a diagrammatic representation showing the furcation assembly of FIG. 2 with the protective boot interlocked with the first housing piece.

FIG. 5 is a perspective view of the fully assembled furcation assembly of FIG. 2.

FIG. 11A is an exploded perspective view showing components of a furcation assembly constructed in accordance with another embodiment of the present invention.

FIG. 11B is a cross-sectional view of the furcation assembly of FIG. 11A taken along line 11B-11B after the furcation assembly has been assembled.

FIG. 12A is an exploded perspective view showing components of a furcation assembly constructed in accordance with another embodiment of the present invention.

FIG. 12B is a cross-sectional view of the furcation assembly of FIG. 12A taken along line 12B-12B after the furcation assembly has been assembled.

Figure 1:
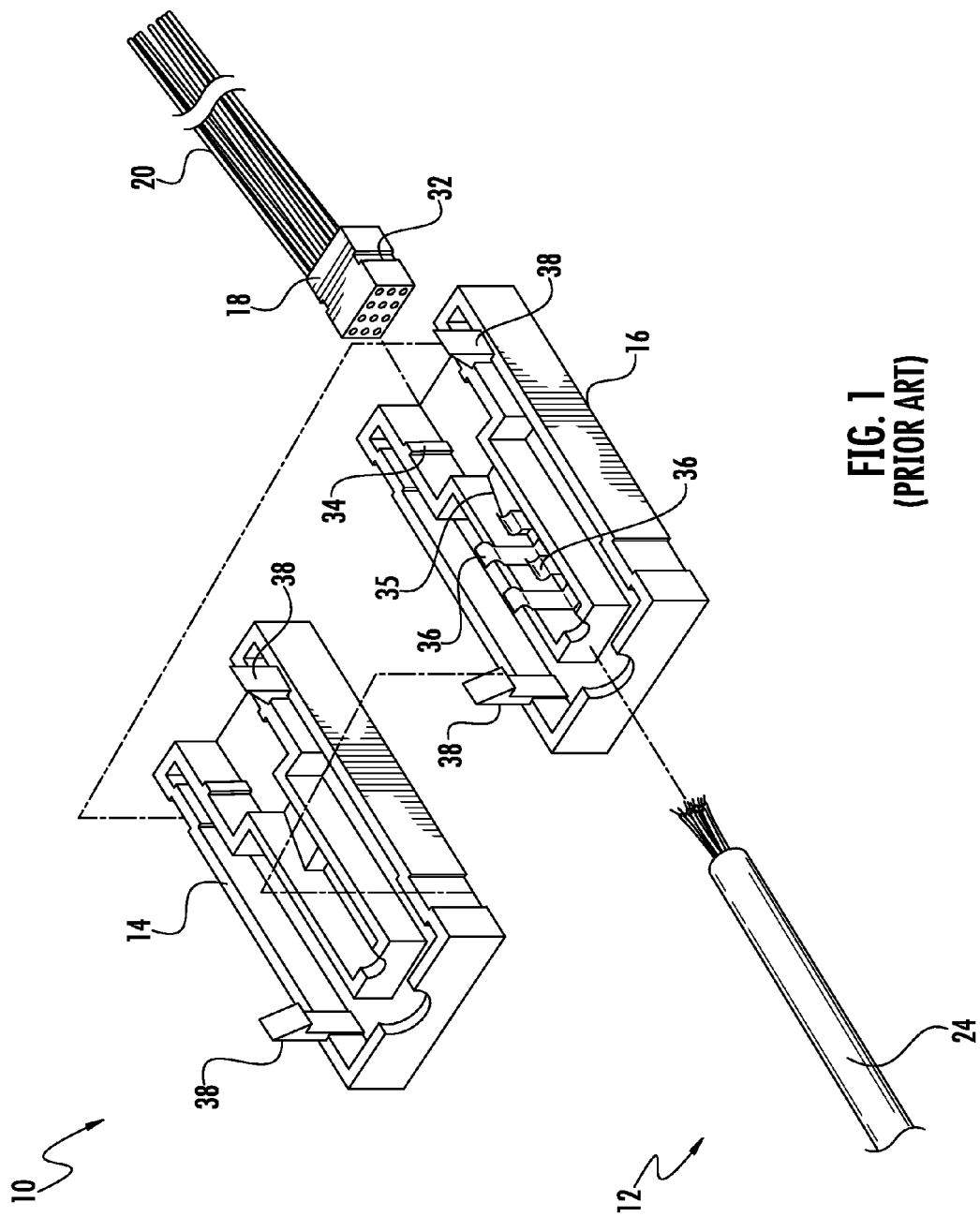
FIG. 1 is a diagrammatic representation showing a furcation kit of the prior art.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations.

Embodiments of the present invention provide furcation kits which are partially configured at the factory, but final installation is completed by the end-user in the field or other area of application. As described above, a typical multi-fiber cable contains a plurality of optical fibers extending along its axis. Each of the optical fibers comprises an optical conductor (i.e., a glass fiber) disposed inside a protective sheath. Typically, the protective sheath may be formed of a suitable polymer such as acrylate and may be color-coded according to industry standards. As used herein, the term "optical fiber" is intended to be synonymous with the optical fiber unit including the glass fiber and protective sheath. The number of optical fibers within each multi-fiber cable may vary, but typical fiber counts are 4, 6, 12, etc. In addition, a multi-fiber cable may further include loose aramid filaments or other strengthening members that provide strength and/or rigidity. The optical fibers (and aramid filaments) of a multi-fiber cable are encased in an outer jacket, which may be formed of a suitable material such as plenum-rated PVC, riser-rated PVC, or LSZH.

While the embodiments of the multi-fiber cable shown in the drawings contain twelve optical fibers, one skilled in the art will appreciate that a greater or lesser number of optical fibers may be provided as needed or desired for a particular application. Furthermore, although the present invention is described herein in relation to fiber optic systems, it is contemplated that aspects of the invention may be applicable and useful for other conductor types or cable configurations.

Figure 2:
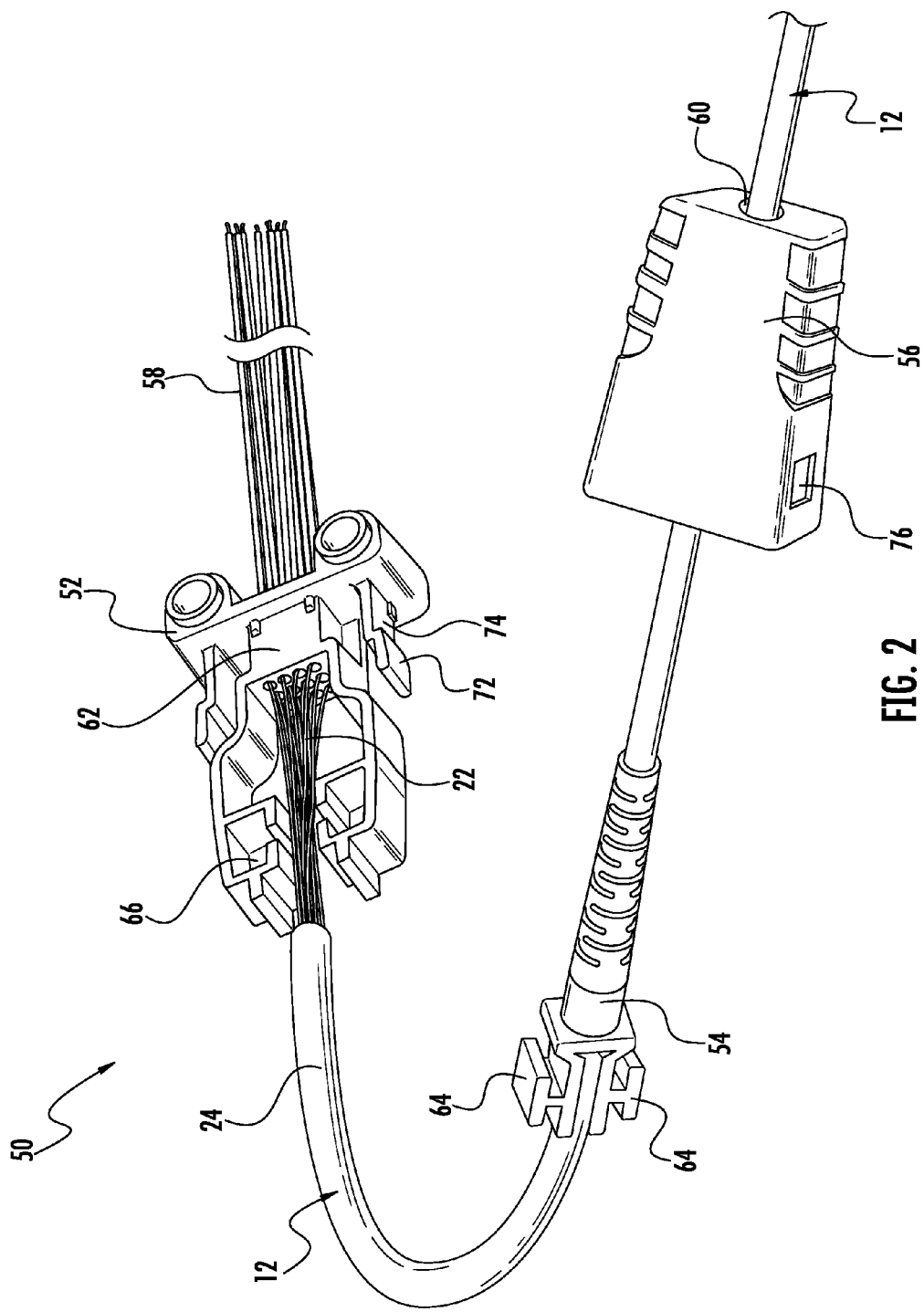
FIG. 2 is a diagrammatic representation showing components of a furcation assembly constructed in accordance with an embodiment of the present invention.

Referring now to FIG. 2, a furcation assembly 50 in accordance with an embodiment of the present invention is illustrated. Furcation assembly 50 functions to transition individual optical fibers 22 from multi-fiber cable 12. In this regard, furcation assembly 50 includes a first housing piece 52, a protective boot 54, and a second housing piece here in the form of a housing cover 56. As will be explained, the individual optical fibers 22 contained within multi-fiber cable 12 are separated into respective furcation tubes 58 in this case. In other embodiments, as will be described below, a smaller number of furcation tubes may be provided to receive groups of fibers. Of course, the diameter of the furcation tubes might need to be greater to accommodate such groups of fibers.

A preferred manner in which furcation assembly 50 may be utilized will now be described with reference to FIGS. 2-5. First, referring to FIG. 2, the end of a multi-fiber cable 12 is inserted through an aperture 60 defined in the base of housing cover 56. In addition, protective boot 54 defines an axial bore through which cable 12 is inserted. Once a desired length of cable 12 is pulled through the protective boot 54, a selected portion of the outer jacket 24 (and any strengthening members) is removed, exposing the individual optical fibers 22.

Each individual optical fiber 22 is then inserted into a respective hole of a furcation block 62 integrally formed in this embodiment as part of the first housing piece 52. Furcation tubes 58, which are preferably preassembled with furcation block 62, align with the respective furcation holes as will be described more fully below. Optical fibers 22 are fed through respective furcation tubes 58 until they exit the opposite end. The portion of each optical fiber 22 that extends beyond its respective furcation tube 58 can then be stripped, cleaned, and prepared for termination. Tubes 58 protect their respective optical fibers 22 and provide sufficient diameter for a conventional fiber optic connector.

Preferably, tubes 58 may be transparent to show the color-coded protective sheaths of optical fibers 22 located therein.

After the multi-fiber cable 12 is situated at the desired position with respect to the first housing piece 52, protective boot 54 is moved toward first housing piece 52. As shown in FIG. 3, boot 54 has protruding retaining features 64 that are positioned in corresponding retaining slots 66 defined in the first housing piece 52. As a result, first housing piece 52 and protective boot 54 are interlocked and fixed in position with respect to each other.

Figure 4A:
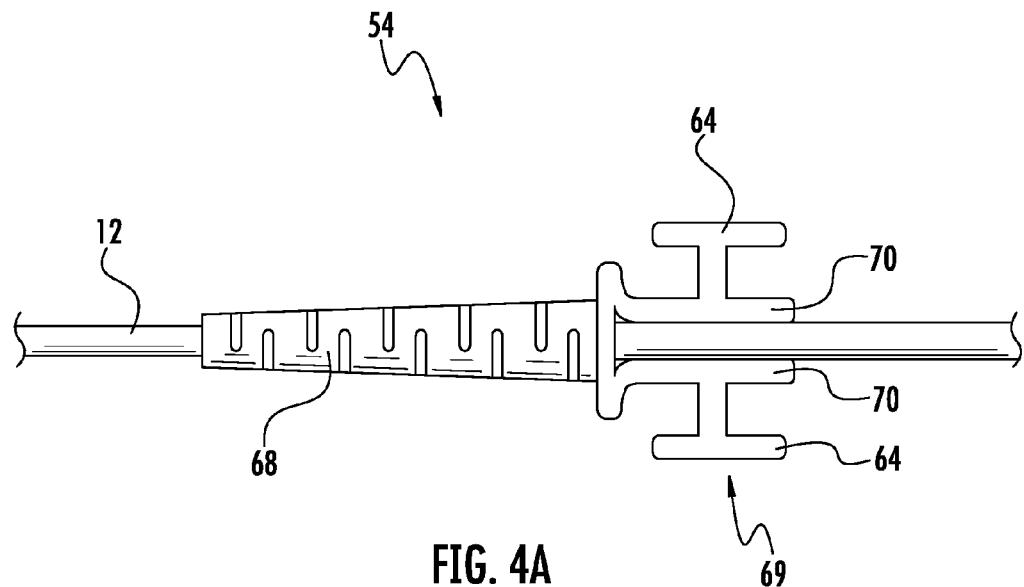
FIG. 4A is a plan view of the protective boot shown in FIG. 2.
Figure 4B:
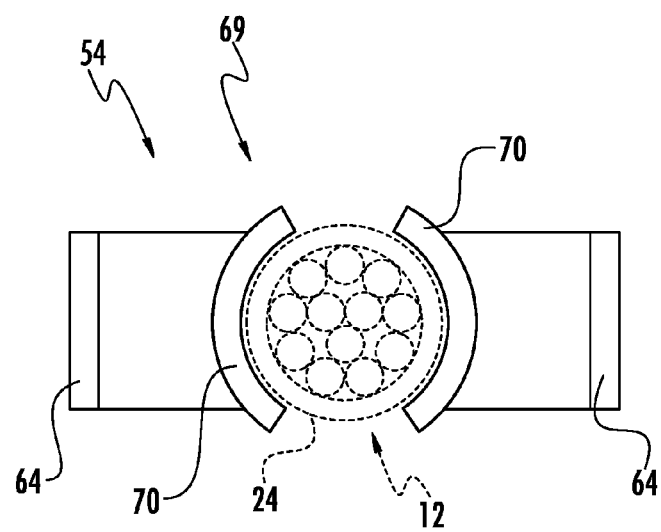
FIG. 4B is an end view of the protective boot shown in FIG. 2 illustrating the curvature of the opposing pad structures, and the multi-fiber cable in phantom.

Further details regarding protective boot 54 are evident in FIGS. 4A and 4B. As can be seen in FIG. 4A, boot 54 includes an extension sleeve 68 and a gripping portion 69. Extension sleeve 68 preferably has a tapered structure such that its diameter decreases away from gripping portion 69. As shown, a plurality of transverse grooves or slots may be defined in the outer surface of extension sleeve 68 to enhance flexibility of boot 54 for desired movement of cable 12. In this embodiment, retaining features 64 are formed as T-shaped structures extending laterally from respective pad structures 70. Preferably, as can be seen in FIG. 4B, these pad structures 70 may be concave to complement the outer surface of cable 12. As will be explained, pad structures 70 thus grip outer jacket 24 to fix boot 54 at a desired location along the length of cable 12.

Figure 6:
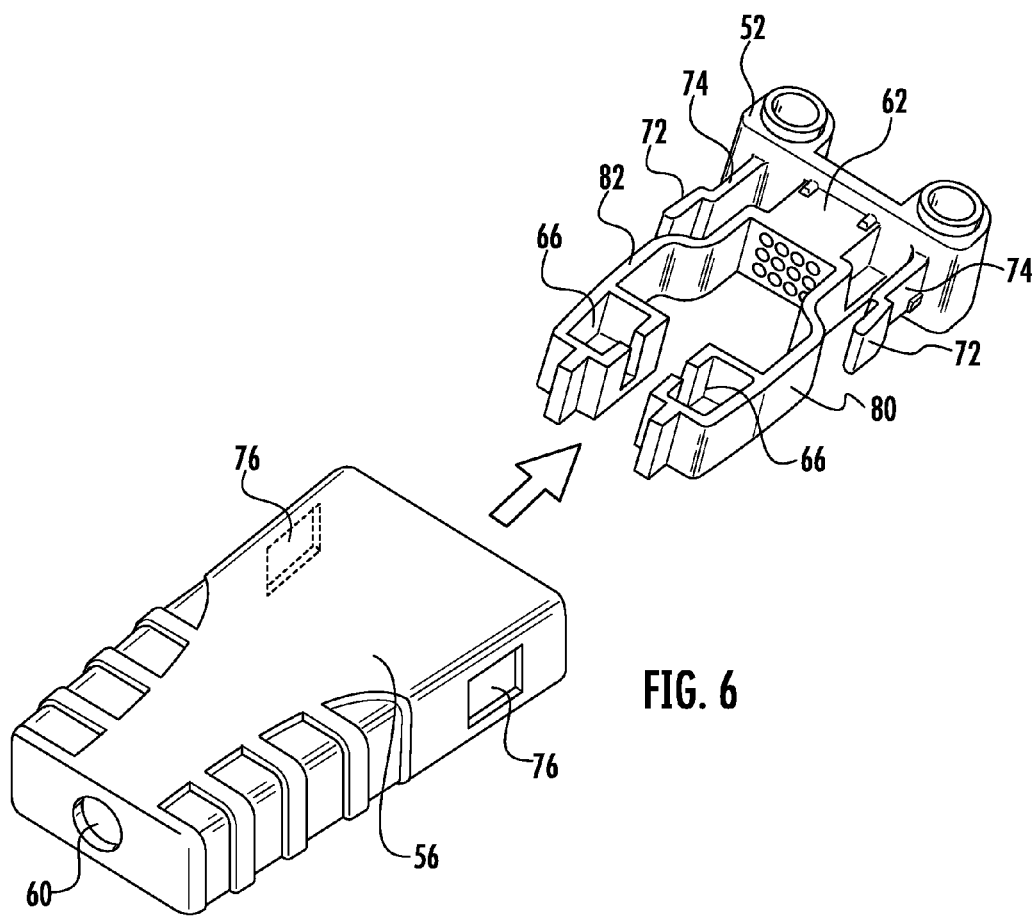
FIG. 6 is a perspective view of the first housing piece and housing cover shown in FIG. 2.

As shown in FIG. 5, the assembly is completed when the housing cover 56 slides over the protective boot 54 such that it clicks into place with respect to first housing piece 52. Toward this end, as shown in FIG. 6, first housing piece 52 may preferably include gripping tabs 72 in the form of outwardly directed projections located at the distal end of respective flexible arms 74. The arms flex 74 inwardly to allow the housing cover 56 to be moved into position over the protective boot 54 and first housing piece 52. The housing cover 56 then locks into closed position when tabs 74 are collocated with corresponding apertures 76 in housing cover 56.

Figure 7:
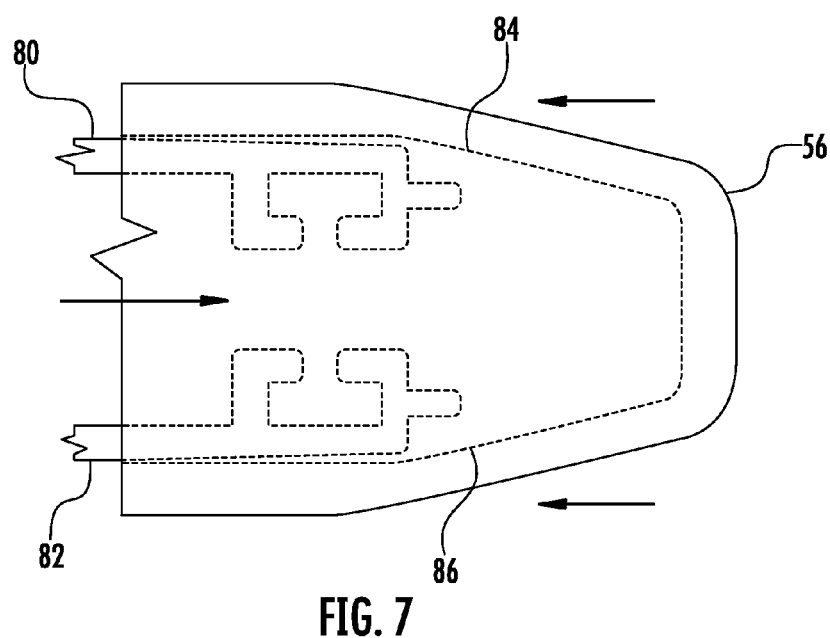
FIG. 7 is a diagrammatic view showing the first housing piece being inserted into the housing cover with the internal surfaces in phantom.

Additional aspects of furcation assembly 50 can be most easily explained with reference to FIGS. 6 and 7. As can be seen, slots 66 of first housing piece 52 are defined at the distal end of opposed cantilevered arms 80 and 82. The outer surface of arms 80, 82 may be ramped so as to be wider at their proximal ends (closest to furcation block 62) and more narrow at their distal ends. It will be appreciated that these ramped surfaces are received in the open end of housing cover 56 as it moved into the closed position. Preferably, housing cover 56 has complementary ramped surfaces 84, 86 in its interior which urge the gripping portion 69 of protective boot 54 firmly against outer jacket 24 of cable 12. Note that FIG. 7 shows slightly exaggerated ramped surfaces 84, 86 to illustrate how the flexible arms 80, 82 will move together as they are received in housing cover 56.

One skilled in the art will appreciate that the described arrangement allows the technician to move flexible boot 54 along cable 12 to find the best final position. Once the protective boot 54 is secured in the retaining slots 66 of the first housing piece 52 and the optical fibers 22 have been properly routed, the housing cover 56 slides onto the first housing piece 52 and ensures that the protective boot 54 sufficiently grips cable 12 to maintain the furcation assembly 50 in position. The cantilever arrangement of flexible arms 74 provides a spring effect, thus snapping tabs 72 into place. It should be further appreciated that furcation assembly 50 can be removed by simply pressing in the tabs 72 until they are clear of aperture 76 and pulling the cover 56 away from the first housing piece 52.

Figure 8:
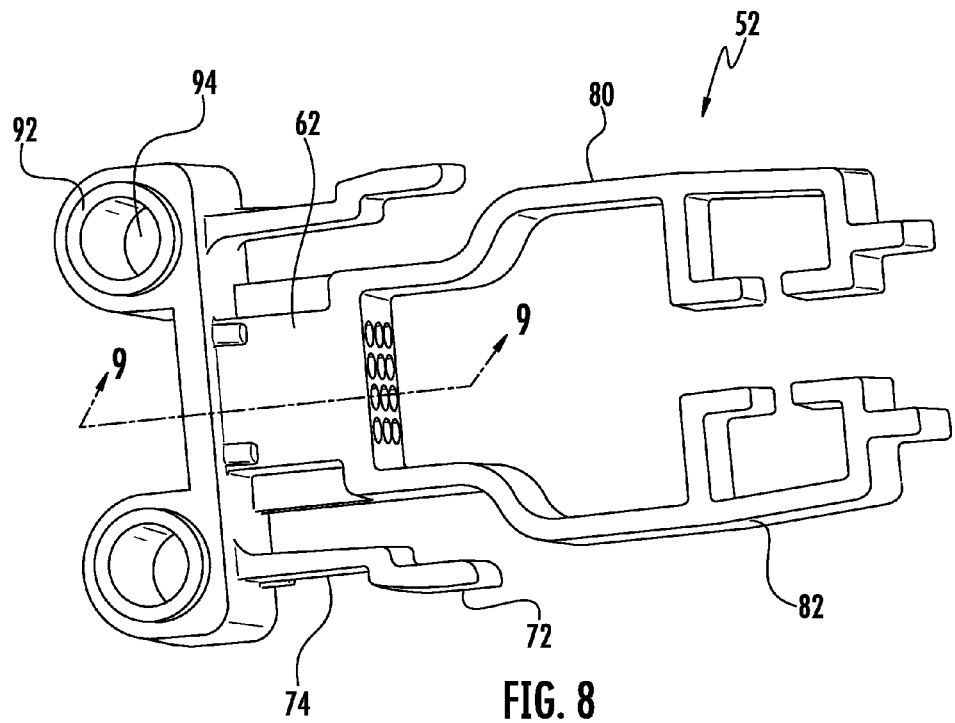
FIG. 8 is a perspective view of the first housing piece shown in FIG. 2.
Figure 9:
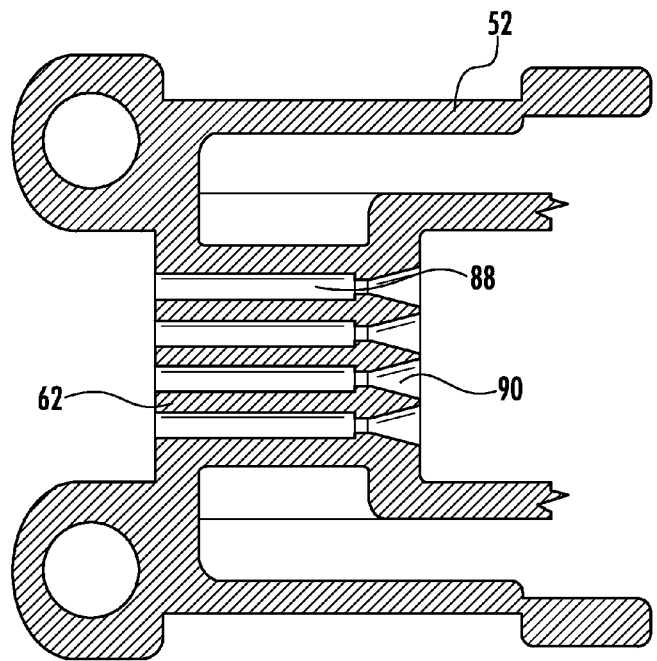
FIG. 9 is an enlarged section view taken along line 9-9 of FIG. 8, showing certain details of a furcation block in accordance with a preferred embodiment.

As noted above, furcation block 62 may be integrally formed as part of first housing piece 52 to reduce the number of parts. Referring now to FIGS. 8 and 9, furcation block 62 includes a plurality of through bores (such as 88) in which the ends of individual furcation tubes 58 are inserted. Typically, furcation tubes 58 will be retained in furcation block 62 by adhesive applied at the factory (i.e., before use by the field technician). As shown in FIG. 9, at the cable end of the furcation block 62, each through bore 88 preferably has a larger diameter funnel 90 (e.g., approximately six times the outer diameter of the fiber being furcated) to facilitate insertion of the individual optical fibers.

Furcation tubes 58 may include one or more of the following: an inner tube for receiving the optical fiber 22, a strength member surrounding the inner tube, and an outer jacket to provide environmental protection. In addition, furcation tubes 58 that have aramid fibers or other strengthening members running along the side of the optical fiber are also contemplated. Furthermore, the furcation tubes 58 are preferably transparent to allow the color of the respective optical fiber 22—i.e., the color of the optical fiber's protective sheath 30—to show through. This eliminates the need to insert each fiber only into a furcation tube that matches its color (as was done in the prior art).

Figure 10:
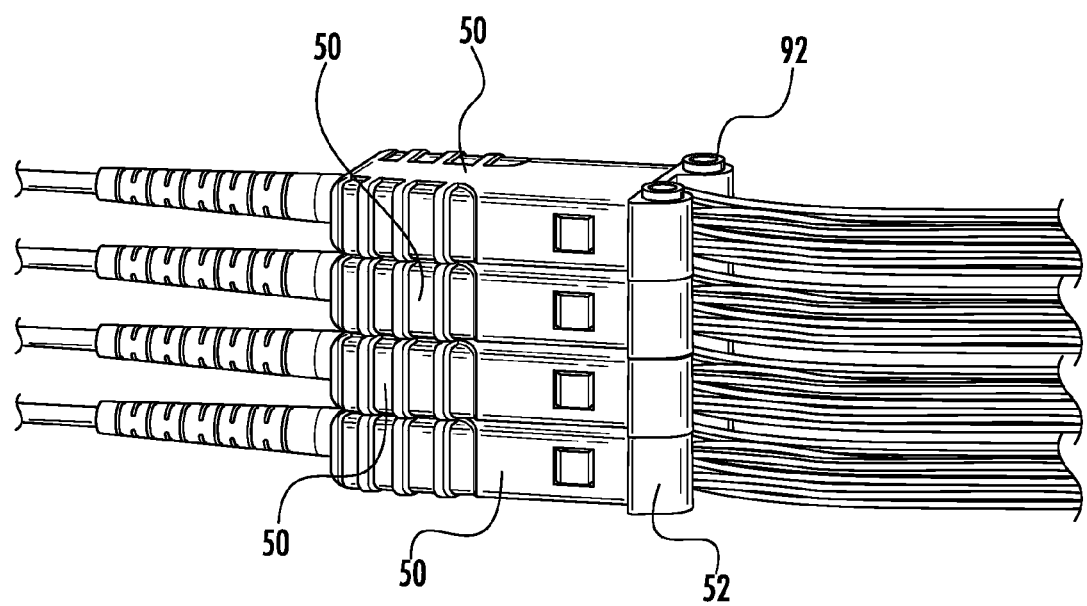
FIG. 10 shows the manner in which multiple furcation assemblies of the present invention may be stacked in accordance with exemplary embodiments.

Referring now to FIG. 10, furcation assembly 50 is preferably equipped to facilitate stacking of multiple units. In this case, for example, the first housing piece 52 includes a pair of pin and sockets 92 that mate with corresponding features on another unit. As shown in FIG. 8, for example, the pin/sockets may circumscribe respective holes 94 that extend through housing piece 52. In particular, the "pins" are located on one side of the first housing piece 52, while the sockets are located on the other, but both circumscribe hole 94. It will be appreciated that holes 94 may be advantageously used for the insertion of mounting hardware and the like. When several units are stacked, the holes 94 will align to produce a longer hole extending through all of the units.

Referring now to FIGS. 11A and 11B, an additional embodiment of a furcation assembly 150 constructed in accordance with the present invention is illustrated. Similar to previously discussed embodiments, this embodiment contains a first housing piece 152, a second housing piece 156, a protective boot 154, and a furcation block 162. However, in this embodiment, the furcation block 162 is configured as a removable, interchangeable unit. The first housing piece 152 may define a furcation block slot 178 for receiving the furcation block 162. Retention clips 179 are located on the first housing piece 152 for securing the furcation block 162 on the first housing piece 152.

In this embodiment, the furcation block 162 has four through bores 188 which each may receive one or more optical fibers. However, one skilled in the art will appreciate that more or fewer through bores 188 may be provided as needed for a specific application. In addition, the size of the through bores 188 need not be a specific size or diameter, but can be smaller or larger depending on the application. A single furcation block 162 may also contain multiple through bores 188 that vary in size.

FIG. 11B shows a cross-sectional view of the furcation assembly 150 of FIG. 11A, as assembled and taken along line 11B-11B. Similar to previous embodiments, the through bores 188 of the furcation block 162 may have a funnel-shaped opening 190 to allow for easy insertion of the fiber or fibers. As can be seen in FIGS. 11A and 11B, the furcation block may also be oriented such that it lies on its side when installed.

Referring now to FIGS. 12A and 12B, an additional embodiment of a furcation assembly 250 constructed in accordance with the present invention is illustrated. This embodiment also contains a first housing piece 252, a second housing piece 256, and a protective boot 254. In addition, this embodiment includes four furcation blocks 262, although more or fewer are also contemplated and within the scope of the invention. The first housing piece 252 may include a number of dividers 281, which together define multiple furcation block slots 278 for receiving a respective furcation block 262. Each furcation block 262 is removable, interchangeable, and may have one or more through bores 288 that may vary in diameter. Retention clips 279 are located on the first housing piece 252 and on the dividers 281 for securing the furcation blocks 262 to the first housing piece 252.

FIG. 12B shows a cross-sectional view of the furcation assembly 250 of FIG. 12A, as assembled and taken along line 12B-12B. Similar to previous embodiments, the through bores 288 of the furcation block 262 may have a funnel-shaped opening 290 (partially visible in FIG. 12B) to allow for easy insertion of the fiber or fibers.

It will be appreciated that the removable furcation blocks of assemblies 150 and 250 allow significant flexibility for whatever situation that the technician encounters. This includes variations in the number of individual fibers in multi-fiber cable 12, as well as the manner in which those fibers are to be furcated. For example, a 12-fiber cable to be individually furcated might use a furcation block having twelve through bores (in the case of furcation assembly 150) or four furcation blocks each having three through bores (in the case of furcation assembly 250). Alternatively, a twenty-four fiber cable to be furcated into three groups of eight fibers might use a three-hole furcation block in the case of furcation assembly 150. In addition, a single furcation block may be configured having holes of different sizes—some of which receive individual fibers and others of which receive groups of fibers. Or, in the case furcation assembly 250, different furcation blocks having different numbers of through bores may be combined in a single furcation assembly for the same purpose.

Although the housing components and boot of the furcation kit may be made of any suitable material, these components may preferably be made from a sufficiently low-cost, light-weight, and resilient polymeric material such as, for example, polycarbonate (PC), polyvinyl chloride (PVC), or polyetherimide (PEI). The use of such polymeric materials provides numerous advantages, such as low cost, ease of manufacturability, and low weight.

It can thus be seen that the present invention provides an improved optical fiber furcation kit having various advantages over the prior art. Some advantages to embodiments of the present invention include, in addition the ones already discussed, the following:

a. Provides a craft friendly easily applied clamping mechanism for holding the multi-fiber cable with sufficient force to be handled.
b. Is compatible with commercially available/common fiber optic adapters.
c. Is compatible with common cable, sub-unit, or loose tube sizes (~2.0 to ~5.5 mm)
d. Can be easily mounted.
e. Can be installed in the field with minimal tools.
f. Is low cost.
g. Boot and gripper combination protects the multi-fiber cable from being bent to a severe angle in which to cause damage to the optical fibers.

h. Tapered (funneled) holes to allow for easy insertion of fibers into the furcation block.
i. Clear furcation tubes reduce the complexity of completing the furcation.
j. Allows for stacking of multiple furcation kits with use of exterior locating pin and sockets.

While one or more example embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A furcation assembly for furcating a multiple fiber cable, the assembly comprising:
    a first housing piece comprising a furcation block and a boot retaining slot;
    a boot for covering the multiple fiber cable near the furcation assembly, the boot comprising a boot retaining feature protruding therefrom; and
    a second housing piece configured to be received over the first housing piece in a manner that promotes firm contact between the boot and multiple fiber cable and locks the furcation assembly into the closed position,
    wherein the multiple fiber cable is inserted through the boot and the boot retaining feature is inserted into the boot retaining slot of the first housing piece, and
    wherein the multiple fiber cable comprises a plurality of optical fibers, each of which is received in one of a plurality of through bores defined in the furcation block.

2. A furcation assembly as set forth in claim 1, wherein the first and second housing pieces have complementary ramped surfaces which together function to urge the boot into engagement with the outer surface of the multiple fiber cable.

3. A furcation assembly as set forth in claim 1, wherein the boot comprises two opposed pad structures each of which has a concave engaging surface to engage the outer surface of the multiple fiber cable.

4. A furcation assembly as set forth in claim 1, wherein the furcation block is an integral part of the first housing piece.

5. A furcation assembly as set forth in claim 1, wherein a plurality of furcation tubes are terminated at the furcation block.

6. A furcation assembly as set forth in claim 5, wherein the plurality of furcation tubes are transparent.

7. A furcation assembly as set forth in claim 1, wherein the through bores have a funnel-shaped opening on the cable end of the furcation block.

8. A furcation assembly as set forth in claim 1, wherein the furcation assembly has a pin and socket arrangement configured to facilitate the stacking of multiple furcation assemblies.

9. A furcation assembly as set forth in claim 1, wherein the furcation assembly has an aperture configured to receive a fastening member.

10. A furcation assembly as set forth in claim 1, wherein complementary surfaces of the first housing piece and the second housing piece have at least one locking tab and aperture, respectively, that releasably engage each other to lock the second housing piece in the closed position while allowing for disassembly of the furcation assembly.

11. A furcation assembly as set forth in claim 1, wherein the second housing piece is a cover.

12. A method for furcating a multi-fiber cable that contains a plurality of optical fibers using a furcation assembly, the method comprising:
    inserting the end of the multi-fiber cable through a boot, the boot comprising a boot retaining feature protruding therefrom;
    inserting the boot retaining feature into a boot retaining slot of a first housing piece, the first housing piece comprising a furcation block and the boot retaining slot, wherein each of the plurality of optical fibers of the multi-fiber cable is received in one of a plurality of through holes defined in the furcation block; and
    receiving a second housing piece over the first housing piece in a manner that promotes firm contact between the boot and the multiple fiber cable and locks the furcation assembly into a closed position.

* * * * *